US008766468B1

(12) United States Patent
Rilla et al.

(10) Patent No.: US 8,766,468 B1
(45) Date of Patent: Jul. 1, 2014

(54) ROTOR FOR A PERMANENT MAGNET ELECTRICAL MACHINE OF A MOBILE WORKING MACHINE

(71) Applicant: Visedo Oy, Lappeenranta, FL (US)

(72) Inventors: Marko Rilla, Lappeenranta, FL (US); Timo Päivinen, Lappeenranta, FL (US)

(73) Assignee: Visedo Oy, Lappeenranta (FI)

( * ) Notice: Subject to any disclaimer, the term of this patent is extended or adjusted under 35 U.S.C. 154(b) by 0 days.

(21) Appl. No.: 13/755,187

(22) Filed: Jan. 31, 2013

(51) Int. Cl.
*B60L 11/02* (2006.01)

(52) U.S. Cl.
USPC ............... 290/45; 310/156.53; 310/156.49

(58) Field of Classification Search
CPC .................................... H02K 1/272
USPC ............................ 310/156.53, 156.49
See application file for complete search history.

(56) References Cited

U.S. PATENT DOCUMENTS

| | | | | |
|---|---|---|---|---|
| 6,008,559 A * | 12/1999 | Asano et al. | ............ | 310/156.53 |
| 7,619,332 B2 * | 11/2009 | Kimura et al. | ............ | 310/58 |
| 7,868,502 B2 * | 1/2011 | Lee | ............ | 310/156.56 |
| 8,212,447 B2 * | 7/2012 | Fukuda et al. | ............ | 310/156.53 |
| 2005/0269888 A1 | 12/2005 | Utaka | | |
| 2008/0272667 A1 | 11/2008 | Ionel et al. | | |
| 2009/0261679 A1 * | 10/2009 | Sakai et al. | ............ | 310/156.53 |
| 2011/0133590 A1 | 6/2011 | Lokhandwalla | | |
| 2012/0112466 A1 * | 5/2012 | Junge et al. | ............ | 290/55 |

FOREIGN PATENT DOCUMENTS

| | | |
|---|---|---|
| EP | 2 012 410 | 1/2009 |
| EP | 2 362 525 | 8/2011 |

OTHER PUBLICATIONS

European Search Report dated May 25, 2012, corresponding to the Foreign Priority Application No. EP 11 19 2504.

* cited by examiner

*Primary Examiner* — Michael Zarroli
(74) *Attorney, Agent, or Firm* — Young & Thompson (57) ABSTRACT

A rotor for a permanent magnet electrical machine includes a ferromagnetic core structure having cavities which divide the ferromagnetic core structure into pole regions (103), a yoke region (104), and bridges (105, 106) between them. The rotor includes permanent magnets (107, 108) located in the cavities and arranged to produce magnetic fluxes penetrating the pole regions so as to form magnetic poles of the rotor. The cavities have portions which extend towards the quadrature-axis (Q) and are free from the permanent magnets. Thus, non-ferromagnetic regions for reducing leakage fluxes of the permanent magnets are being formed. Furthermore, the portions of the cavities have a shape curving towards the geometrical rotation axis of the rotor. As the portions of the cavities have the shape curving towards the rotation axis, the cavities can be made longer and the routes of the leakage.

20 Claims, 5 Drawing Sheets

ROTOR FOR A PERMANENT MAGNET ELECTRICAL MACHINE OF A MOBILE WORKING MACHINE

FIELD OF THE INVENTION

The invention relates generally to rotating electrical machines. More particularly, the invention relates to a rotor comprising interior permanent magnets. Furthermore, the invention relates to a permanent magnet electrical machine for e.g. a mobile working machine. Furthermore, the invention relates to a mobile working machine.

BACKGROUND

Rotating electrical machines, such as motors and generators, generally comprise a rotor and a stator which are arranged such that a magnetic flux is developed between these two. In a permanent magnet "PM" electrical machine, a number of permanent magnets are usually mounted on the rotor, while the stator is provided with stator windings. The permanent magnets and electrical currents in the stator windings cause a magnetic flux to flow across the air-gap between the rotor and the stator.

A rotor of a permanent magnet electrical machine comprises typically a ferromagnetic core structure, a shaft, and permanent magnets arranged to produce magnetic fluxes so as to form magnetic poles of the rotor. When designing a rotor of a permanent magnet electrical machine there are various aspects to be taken into account. The electro-magnetic characteristics of the rotor should be such that it can provide desired performance with sufficiently low losses, the mechanical characteristics of the rotor should be such that the mechanical structures of the rotor can withstand the ensued mechanical stresses, and the thermal characteristics of the rotor should be such that the heat caused by the losses can be removed from the rotor. Furthermore, the high price of high-quality permanent magnet material causes a need to minimize the amount of permanent magnet material used in the rotor.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the first aspect of the invention, there is provided a new rotor for a permanent magnet electrical machine of, for example, a mobile working machine. The rotor comprises:
- a ferromagnetic core structure comprising cavities dividing the ferromagnetic core structure into pole regions, a yoke region, and bridges between the pole regions and the yoke region, and
- permanent magnets located in the cavities and arranged to produce magnetic fluxes penetrating the pole regions in radial directions so as to form magnetic poles of the rotor, the direction of the magnetic flux penetrating each pole region defining a direct-axis of the corresponding magnetic pole and a symmetry line between direct-axes of two adjacent magnetic poles defining a quadrature-axis between these two adjacent magnetic poles.

The cavities have portions which extend towards the quadrature-axis and are free from the permanent magnets. Thus, non-ferromagnetic regions for reducing leakage fluxes of the permanent magnets are being formed. Furthermore, the above-mentioned portions of the cavities have a shape curving towards the geometrical rotation axis of the rotor and the radial height of the said portions of the cavities is greater than the radial thickness of those parts of the permanent magnets which abut on the said portions of the cavities. As the portions of the cavities have the shape curving towards the geometrical rotation axis, the cavities can be made longer and thereby the routes of the leakage fluxes around the non-ferromagnetic regions can be made longer. This further reduces the leakage fluxes of the permanent magnets. The ferromagnetic core structure defining the above-mentioned portions of the cavities and facing towards the non-ferromagnetic regions have profiles in a plane perpendicular to the geometrical rotation axis of the rotor so that:
  a) each of the profiles is curvilinear on a portion of the profile from a first point of the profile farthest from the geometrical rotation axis of the rotor to a second point of the profile nearest to the geometrical rotation axis of the rotor,
  b) the radius of curvature of each of the profiles depends on distance to the geometrical rotation axis of the rotor so that the radius of curvature is an ascending function of the distance on the portion of the profile from the first point of the profile to the second point of the profile, and
  c) each of the profiles is substantially tangentially directed and meets the relevant permanent magnet at the first point of the profile.

Because of the above-presented features a)-c), the cavities can be extended in the radial directions towards the geometrical rotation axis of the rotor without excessively sacrificing the mechanical characteristics of the rotor. By reducing the leakage fluxes of the permanent magnets, the needed amount of the permanent magnet material can be decreased. The permanent magnets are, advantageously but not necessarily, rectangular prisms which are more economical to manufacture than, for example, curved permanent magnets. Furthermore, a curved shape can be approximated with two or more rectangular permanent magnets which are arranged to form a fraction-line arch.

In accordance with the second aspect of the invention, there is provided a new permanent magnet electrical machine for a mobile working machine. The permanent magnet electrical machine comprises a stator and a rotor, wherein the rotor is according to the present invention.

In accordance with the third aspect of the invention, there is provided a new mobile working machine. The mobile working machine comprises:
  a combustion engine, and
  an electromechanical power transmission chain between the combustion engine and one or more wheels of the mobile working machine,
wherein the electromechanical transmission chain comprises at least one permanent magnet electrical machine according to the present invention.

The mobile working machine comprises preferably a liquid cooling system arranged to cool both a hydraulic system of the mobile working machine and the electromechanical power transmission chain. The mobile working machine can be, for example, a tractor, a bucket charger, a road drag, a bulldozer, or any other working machine having wheels and/or chain tracks.

A number of non-limiting exemplifying embodiments of the invention are described in accompanied dependent claims.

Various exemplifying embodiments of the invention both as to constructions and to methods of operation, together with additional objects and advantages thereof, will be best understood from the following description of specific exemplifying embodiments when read in connection with the accompanying drawings.

The verb "to comprise" is used in this document as an open limitation that neither excludes nor requires the existence of unrecited features. The features recited in depending claims are mutually freely combinable unless otherwise explicitly stated.

BRIEF DESCRIPTION OF THE FIGURES

The exemplifying embodiments of the invention and their advantages are explained in greater detail below in the sense of examples and with reference to the accompanying drawings, in which:

FIG. 1b shows a partial magnification of FIG. 1a, FIG. 2 shows a section view of a rotor according to an embodiment of the invention, the section being taken along a plane perpendicular to the geometrical rotation axis of the rotor.

DESCRIPTION OF THE EXEMPLIFYING EMBODIMENTS

Rotors according to advantageous and exemplifying embodiments of the invention are described below with references to FIGS. 1a and 1b.

Figure 1A:
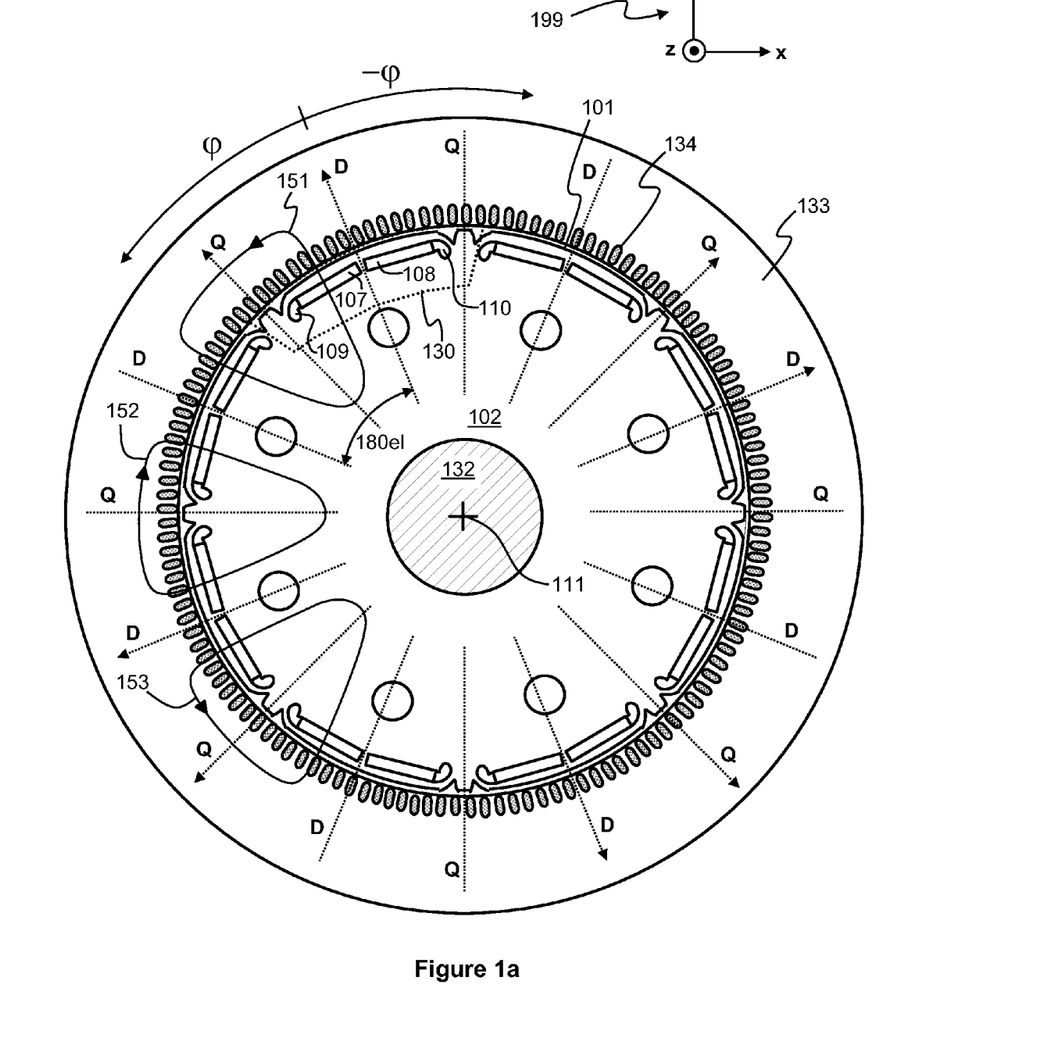
FIG. 1a shows a section view of a permanent magnet electrical machine according to an embodiment of the invention, the section being taken along a plane perpendicular to the geometrical rotation axis of the rotor.

FIG. 1a shows a section view of a permanent magnet electrical machine according to an exemplifying embodiment of the invention. The permanent magnet electrical machine comprises a rotor 101 attached to a shaft 132 and a stator 133 provided with stator windings 134. The section shown in FIG. 1a is taken along a plane perpendicular to the geometrical rotation axis 111 of the rotor 101, i.e. the section is taken along the xy-plane of a coordinate system 199. The geometrical rotation axis 111 is parallel to the z-axis of the coordinate system 199. FIG. 1b shows a magnification of a portion 130 of FIG. 1a. The rotor 101 comprises a ferromagnetic core structure 102 that can be composed of ferromagnetic steel sheets stacked in the direction of the geometrical rotation axis 111 of the rotor. As another exemplifying alternative, the ferromagnetic core structure 102 can be made of solid steel and furthermore it can be the same piece with the shaft 132. It is also possible that the ferromagnetic core structure 102 is made of or comprises ferrite or iron powder composites such as SOMALOY® (Soft Magnetic Composite). In the case where the ferromagnetic core structure is made of solid steel, the air-gap between the rotor and the stator is typically larger than in the case where the ferromagnetic core structure is composed of stacked steel sheets in order to keep the pulsation losses due the stator slotting at a sufficiently low level. The ferromagnetic core structure 102 comprises cavities which divide the ferromagnetic core structure into pole regions 103, a yoke region 104, and bridges 105, 106 between the pole regions and the yoke region as illustrated in FIG. 1b. The rotor 101 comprises permanent magnets, such as permanent magnets 107 and 108, located in the cavities and arranged to produce magnetic fluxes penetrating the pole regions in radial directions so as to form magnetic poles of the rotor. In FIG. 1a, flux lines 151, 152, and 153 are shown for the sake of illustration. The direction of the magnetic flux penetrating each pole region defines a direct-axis D of the corresponding magnetic pole and a symmetry line between direct-axes of two adjacent magnetic poles defines a quadrature-axis Q between these two adjacent magnetic poles. The direct- and quadrature-axes are illustrated in FIGS. 1a and 1b. The cavities have portions, such as portions 109 and 110, which extend towards the quadrature-axis Q and which are free from the permanent magnets. Therefore, non-ferromagnetic regions for reducing leakage fluxes of the permanent magnets are being formed. Furthermore, the above-mentioned portions of the cavities have a shape curving towards the geometrical rotation axis 111 of the rotor and, as illustrated in FIG. 1b, the radial height H of the said portions of the cavities is greater than the radial thickness T of those parts of the permanent magnets which abut on the said portions of the cavities. The radial height H of the portions of the cavities is advantageously at least 10% greater than the radial thickness T of the parts of the permanent magnets abutting on the portions of the cavities. As the portions of the cavities have the shape curving towards the geometrical rotation axis, the cavities can be made longer and thereby the routes of the leakage fluxes around the non-ferromagnetic regions can be made longer. This further reduces the leakage fluxes of the permanent magnets.

In a rotor according to an exemplifying embodiment of the invention, surfaces 112 and 113 of the ferromagnetic core structure defining the above-mentioned portions 109 and 110 of the cavities and facing towards the non-ferromagnetic regions have profiles in the plane perpendicular to the geometrical rotation axis 111 of the rotor so that each of the profiles is curvilinear on a portion of the profile from a first point 114 of the profile that is farthest from the geometrical rotation axis of the rotor to a second point 115 of the profile that is nearest to the geometrical rotation axis of the rotor. Smooth and curvilinear shapes of the profiles are advantageous from the viewpoint of mechanical stresses in the material of the ferromagnetic core structure. If the profiles had, for example, sharp angles pointing towards the material of the ferromagnetic core structure and opening towards the cavities, high local stress-maxima would tend to be formed in the vicinity of the points of the sharp angles.

In a rotor according to an exemplifying embodiment of the invention, the radius of curvature R of each profile depends advantageously on the distance to the geometrical rotation axis 111 of the rotor so that the radius of curvature R is an ascending function of the distance on the portion of the profile from the first point 114 of the profile to the second point 115 of the profile. Therefore, the profile has a form of a spiral on the portion from the first point 114 to the second point 115. Thus, the radius of curvature R of the profiles is such that the tendency to high local mechanical stress maxima in the material of the ferromagnetic core structure is smaller where the centrifugal acceleration $\omega^2 r$ that causes mechanical stresses in the material of the ferromagnetic core structure is higher. In the above-mentioned formula $\omega^2 r$, $\omega$ is the angular velocity of the rotor and r is the distance to the geometrical rotation axis.

In a rotor according to an exemplifying embodiment of the invention, each profile is substantially tangentially directed and meets the relevant permanent magnet at its farthest point from the geometrical rotation axis of the rotor. This is illustrated in FIG. 1b where the profile is farthest from the geometrical rotation axis and meets the permanent magnet 107 at the point 114 at which the profile is parallel to the tangentially directed line 154.

In a rotor according to an exemplifying embodiment of the invention, the permanent magnets are rectangular prisms, a direction of magnetization of each permanent magnet is substantially perpendicular to two mutually opposite facets of that permanent magnet, and a spatial line via a center of mass of that permanent magnet and perpendicular to the two mutually opposite facets of that permanent magnet is substantially radially directed. This is illustrated in FIG. 1b where the direction of magnetization 116 of the permanent magnet 107 is illustrated with an arrow that is substantially perpendicular to two mutually opposite facets 117 and 118 of the permanent magnet 107, and the spatial line 119 via the center of mass of the permanent magnet 107 and perpendicular to the two mutually opposite facets 117 and 118 of the permanent magnet is substantially radially directed, i.e. the spatial line 119 intersects the geometrical rotation axis 111.

In a rotor according to an exemplifying embodiment of the invention, the ferromagnetic core structure comprises grooves, such as grooves 120 and 121, on its outer surface between adjacent magnetic poles of the rotor for narrowing the bridges 105 which are tangentially as outmost in each magnetic pole of the rotor so as to reduce the leakage fluxes of the permanent magnets. The term "tangentially as outmost" means outmost in the directions defined by the angles φ and −φ shown in FIG. 1a. Advantageously, there are two grooves, such as grooves 120 and 122, between adjacent magnetic poles of the rotor so that there is a ridge 123 between these two grooves. The purpose of the ridge 123 is to increase the quadrature-axis inductance $L_Q$. In the permanent magnet electrical machine shown in FIG. 1a, the direct axis-inductance $L_D$ is smaller than the quadrature-axis inductance $L_Q$ because the relative permeability $\mu_r$ of permanent magnets is significantly smaller than that of the material of the ferromagnetic core structure 102. The reluctance torque $T_R$ that can be produced by the permanent magnet electrical machine is substantially:

$$T_R \approx C \times U_s^2 (1/L_Q - 1/L_D) \sin(2\delta), \quad (1)$$

where $U_s$ is the stator voltage, $\delta$ is the angle in electrical degrees between the direct-axis D and the space vector of the stator flux produced by the permanent magnets and the stator currents, and C is a constant depending on the number of pole pairs, the frequency of the stator voltage, and the number of phases. As can be seen from equation (1), the maximum value of the reluctance torque that occurs at $\delta=135$ electrical degrees can be increased by increasing the quadrature-axis inductance $L_Q$. By increasing the reluctance torque $T_R$ with the aid of the ridges 123 which increase the quadrature-axis inductance $L_Q$, it is possible to achieve the required torque with a smaller amount of expensive permanent magnet material.

The bridge 106 between the mutually adjacent permanent magnets 107 and 108 is advantageously, in the tangential direction, as thin as it can be taking into account the mechanical strength conditions so as to minimize the leakage flux via this bridge 106. The corners of the bridge 106 are advantageously rounded so as to further reduce the leakage flux. The rounding 125 has a shape curving from a surface 117 of the respective permanent magnet 107 towards the air-gap surface of the rotor and further back to the flank of the permanent magnet 107.

Figure 1B:
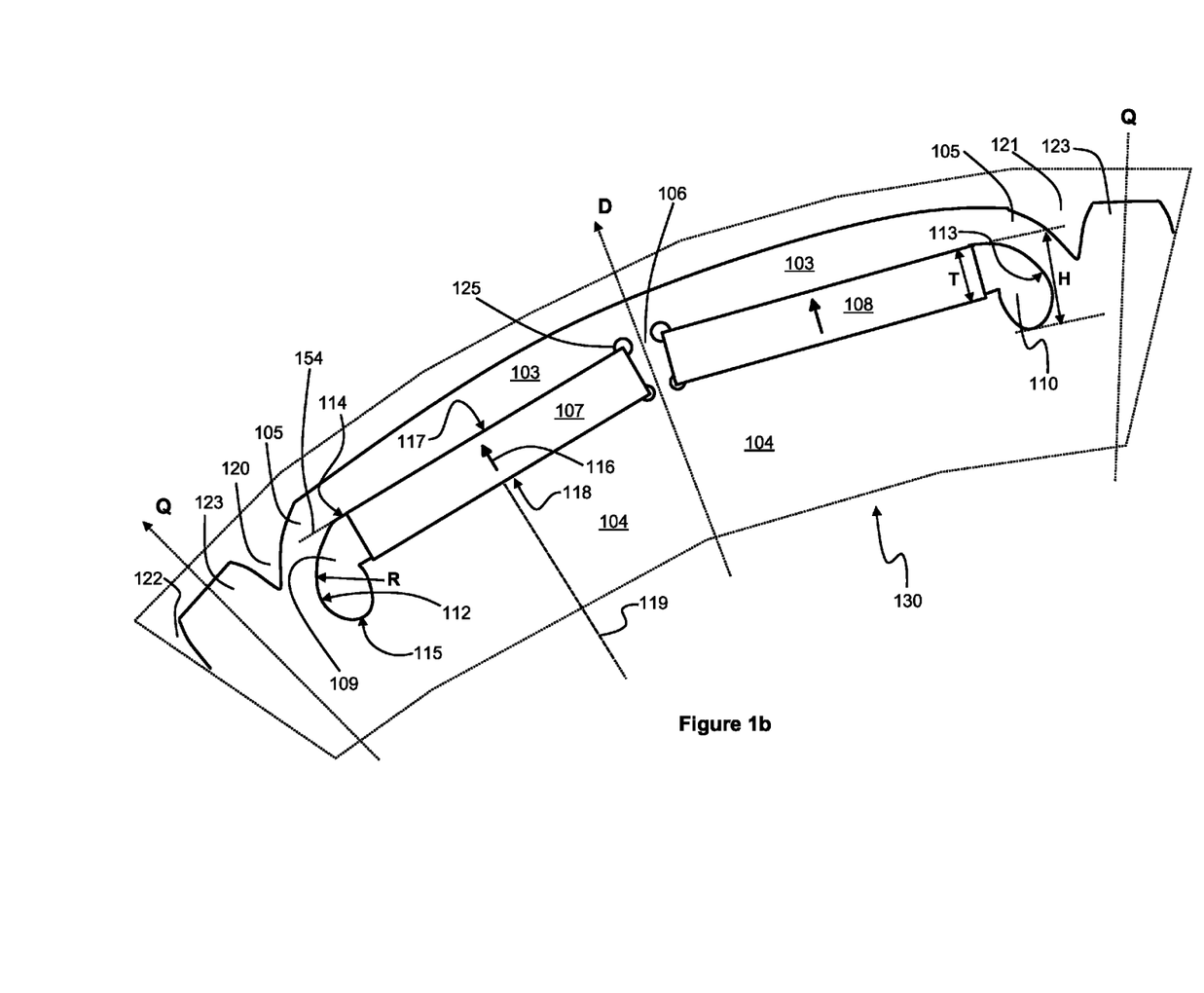
Figure 2:
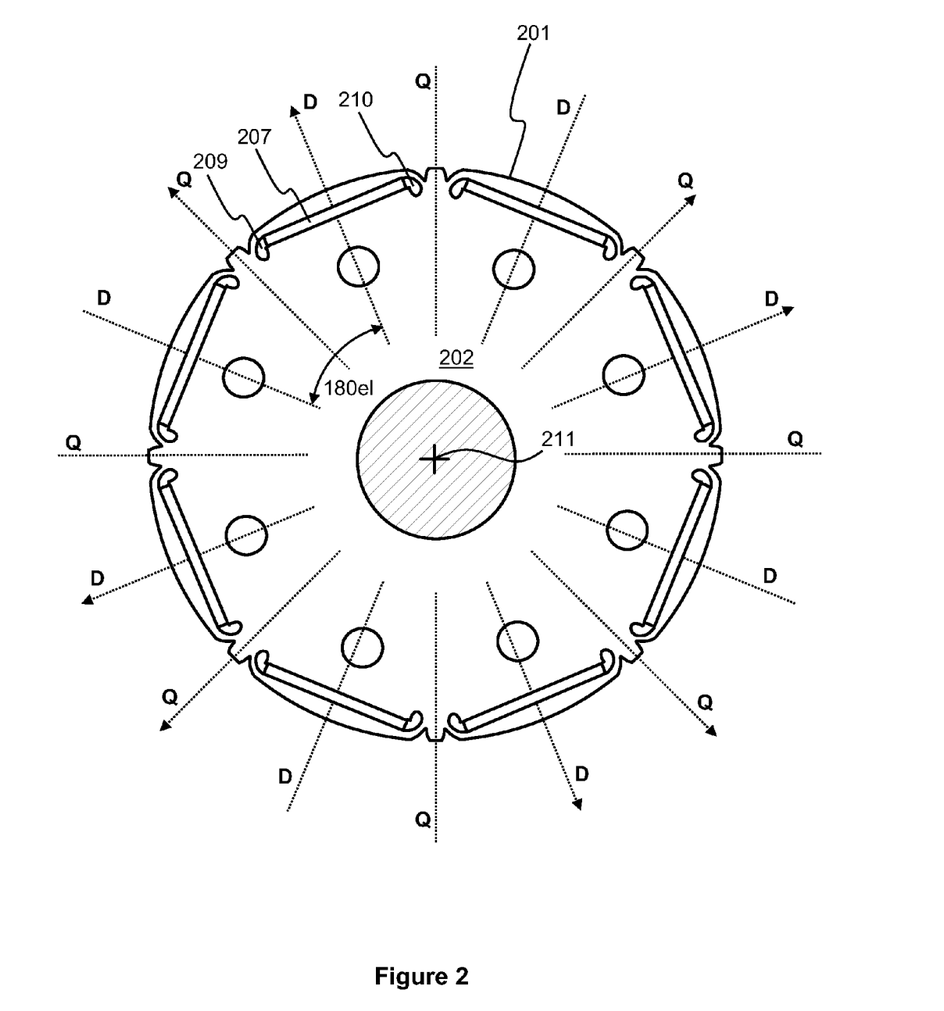

In the rotor 101 of the permanent magnet electrical machine illustrated in FIGS. 1a and 1b, the number of the permanent magnets per the number of the magnetic poles of the rotor is two, i.e. there are two permanent magnets per each magnetic pole of the rotor. FIG. 2 shows a section view of a rotor 201 according to an exemplifying embodiment of the invention where there is one permanent magnet per each magnetic pole of the rotor. The section shown in FIG. 2 is taken along a plane perpendicular to the geometrical rotation axis 211 of the rotor 201, i.e. the section is taken along the xy-plane of a coordinate system 299. The rotor 201 comprises a ferromagnetic core structure 202 comprising cavities dividing the ferromagnetic core structure into pole regions, a yoke region, and bridges between the pole regions and the yoke region. The rotor 201 comprises permanent magnets, such as a permanent magnet 207, located in the cavities and arranged to produce magnetic fluxes penetrating the pole regions in radial directions so as to form magnetic poles of the rotor. The direction of the magnetic flux penetrating each pole region defines a direct-axis D of the corresponding magnetic pole and a symmetry line between direct-axes of two adjacent magnetic poles defines a quadrature-axis Q between these two adjacent magnetic poles. The cavities have portions, such as portions 209 and 210, which extend towards the quadrature-axis Q and are free from the permanent magnets so as to form non-ferromagnetic regions for reducing leakage fluxes of the permanent magnets. These portions of the cavities have a shape curving towards the geometrical rotation axis 211 of the rotor, and the radial height of these portions of the cavities is greater than the radial thickness of the parts of the permanent magnets abutting on these portions of the cavities.

Figure 3:
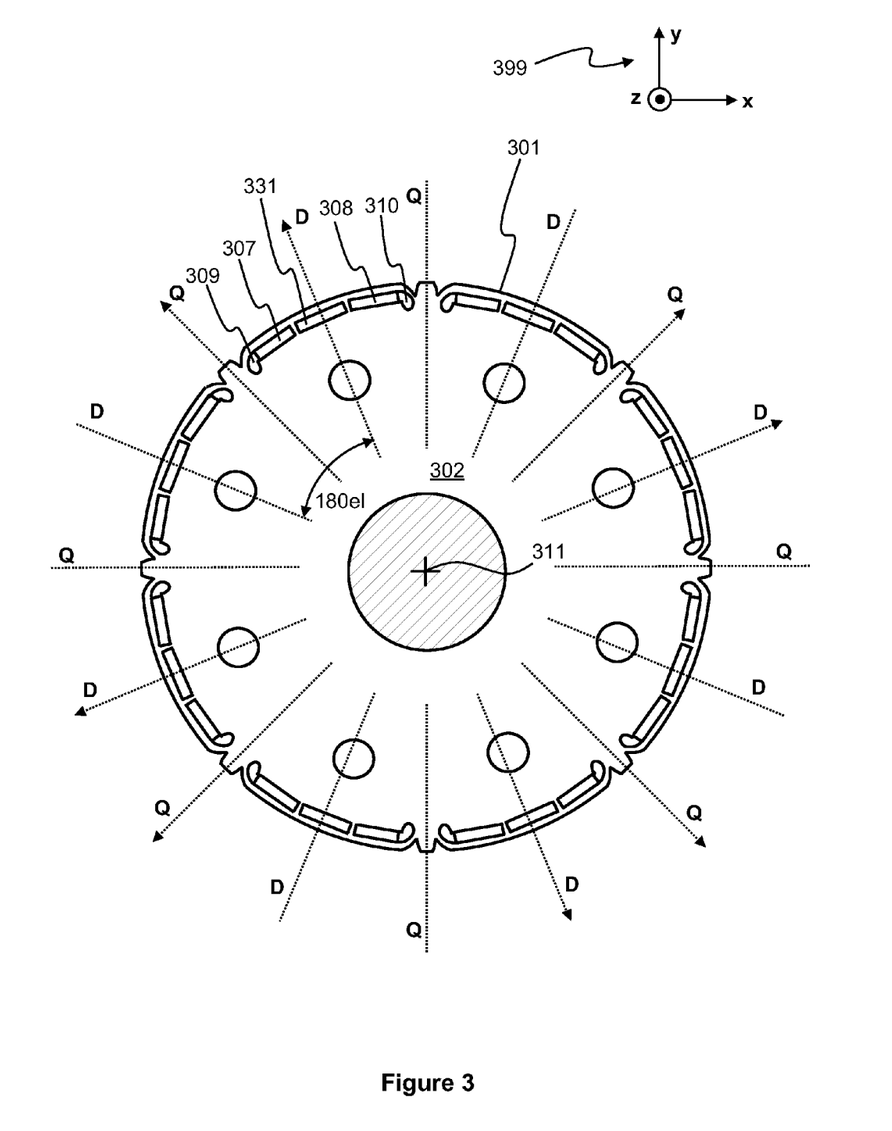
FIG. 3 shows a section view of a rotor according to an embodiment of the invention, the section being taken along a plane perpendicular to the geometrical rotation axis of the rotor.

FIG. 3 shows a section view of a rotor 301 according to an exemplifying embodiment of the invention where there are three permanent magnets per each magnetic pole of the rotor. One of the magnetic poles comprises permanents magnets 307 and 308 that are tangentially as outmost and a permanent magnet 331 between them. As shown in FIG. 3, these three permanent magnets 307, 331 and 308 are arranged to approximate an arch. It is also possible to use a single curved permanent magnet instead of the three rectangular permanent magnets 307, 308, and 331 but it is more complicated and expensive to manufacture curved permanent magnets than rectangular ones. The section shown in FIG. 3 is taken along a plane perpendicular to the geometrical rotation axis 311 of the rotor 301, i.e. the section is taken along the xy-plane of a coordinate system 399. The rotor 301 comprises a ferromagnetic core structure 302 comprising cavities dividing the ferromagnetic core structure into pole regions, a yoke region, and bridges between the pole regions and the yoke region. The rotor 301 comprises permanent magnets, including the permanent magnets 307, 331 and 308, located in the cavities and arranged to produce magnetic fluxes penetrating the pole regions in radial directions so as to form magnetic poles of the rotor. The direction of the magnetic flux penetrating each pole region defines a direct-axis D of the corresponding magnetic pole, and a symmetry line between direct-axes of two adjacent magnetic poles defines a quadrature-axis Q between these two adjacent magnetic poles. The cavities have portions, such as portions 309 and 310, which extend towards the quadrature-axis Q and are free from the permanent magnets so as to form non-ferromagnetic regions for reducing leakage fluxes of the permanent magnets. These portions of the cavities have a shape curving towards the geometrical rotation axis 311 of the rotor, and radial height of these portions of the cavities is greater than the radial thickness of the parts of the permanent magnets abutting on these portions of the cavities.

The number of magnetic poles of the rotors 101, 201 and 301 illustrated in FIGS. 1*a*, 1*b*, 2 and 3 is eight, i.e. the number of the pole pairs is four. Thus, the 180 electrical degrees shown in FIGS. 1*a*, 2 and 3 corresponds to 180/4=45 mechanical degrees. It should be noted that the present invention is not limited to any particular number of poles but the number of poles can be 2, 4, 6 or some bigger even number.

In a rotor according to an exemplifying embodiment of the invention, the number of the magnetic poles of the rotor is at least ten, i.e. the number of the pole pairs is at least five. In applications where a permanent magnet electrical machine is supplied with a frequency converter and high torque is needed at a slow rotation speed, it is often advantageous to have a high number of magnetic poles because the frequency of the supply voltage can be increased by increasing the number of the magnetic poles and, furthermore, the yoke portions of the rotor and the stator can be made thinner when the number of the magnetic poles is increased. The higher frequency of the supply voltage makes it easier to cool the power electronic components of the main circuit of the frequency converter because the load and no-load periods of the power electronic components alternate more frequently. The possibility to make the yoke portions of the stator and the rotor thinner provides savings in the amount of material, the size, and the weight of the permanent magnet electrical machine.

Figure 4:
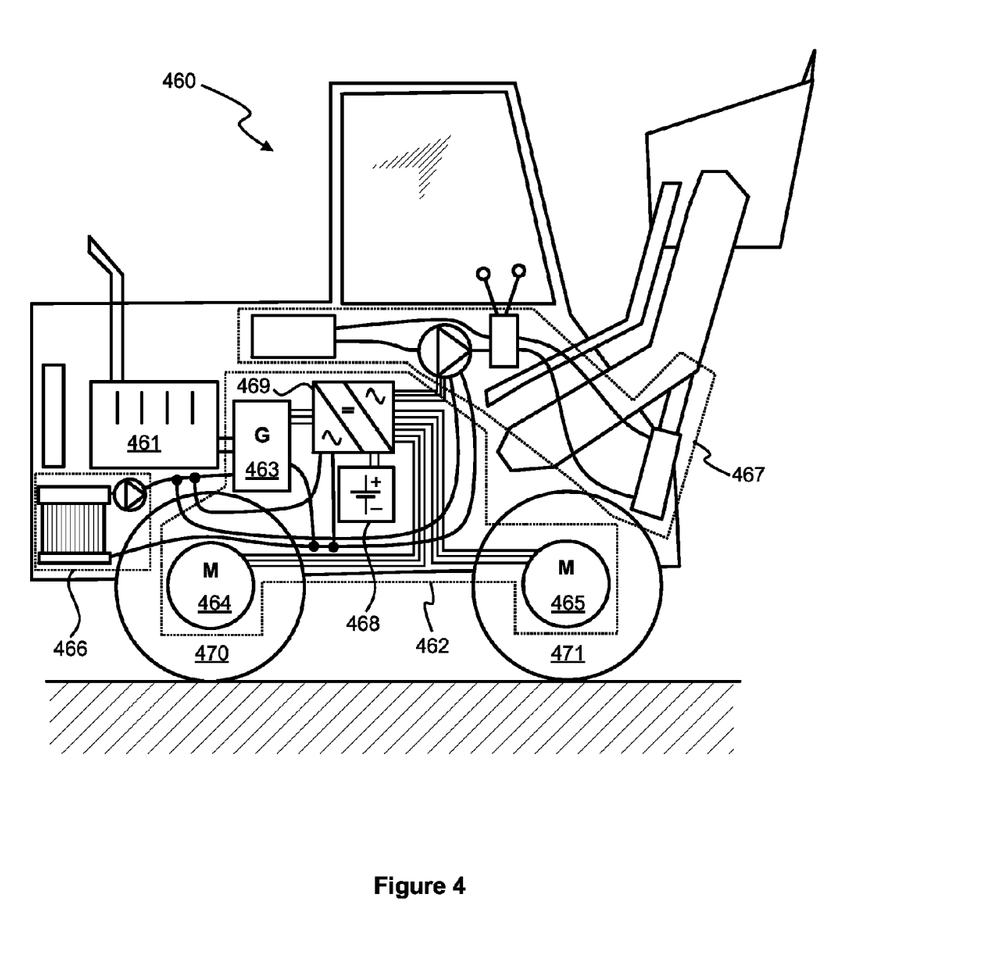
FIG. 4 shows an illustration of a mobile working machine according to an embodiment of the invention.

FIG. 4 shows an illustration of a mobile working machine 460 according to an embodiment of the invention. In this exemplifying case, the mobile working machine is a bucket charger but the mobile working machine could as well be a tractor, a road drag, a bulldozer, or any other working machine having wheels and/or chain tracks. The mobile working machine comprises a combustion engine 461 that can be e.g. a diesel engine, an Otto-cycle engine, or a turbine engine. The mobile working machine comprises an electromechanical power transmission chain 462 between the combustion engine and wheels 470, 471 of the mobile working machine. The electromechanical transmission chain comprises a generator 463 the rotor of which is connected to the shaft of the combustion engine. The electromechanical transmission chain comprises a frequency converter 469 and electrical motors 464, 465 at the hubs of the wheels of the mobile working machine. The frequency converter 469 is arranged to convert the electrical voltage produced by the generator 463 into electrical voltages having amplitudes and frequencies suitable for the electrical motors 464, 465. The frequency converter may have separate output stages for all the electrical motors 464, 465 in which case each electrical motor can be controlled individually, or all the electrical motors 464, 465 can be connected to one and the same output stage of the frequency converter in which case the electrical motors are controlled as a group. The electrical motors 464, 465 are permanent magnet electrical machines each of which comprising a stator and a rotor, wherein the rotor comprises:

a ferromagnetic core structure comprising cavities dividing the ferromagnetic core structure into pole regions, a yoke region, and bridges between the pole regions and the yoke region, and permanent magnets located in the cavities and arranged to produce magnetic fluxes penetrating the pole regions in radial directions so as to form magnetic poles of the rotor, the direction of the magnetic flux penetrating each pole region defining a direct-axis of the corresponding magnetic pole and a symmetry line between direct-axes of two adjacent magnetic poles defining a quadrature-axis between these two adjacent magnetic poles.

The cavities have portions which extend towards the quadrature-axis and are free from the permanent magnets so as to form non-ferromagnetic regions for reducing leakage fluxes of the permanent magnets. Furthermore, the above-mentioned portions of the cavities have a shape curving towards the geometrical rotation axis of the rotor, and the radial height of these portions of the cavities is greater than radial thickness of parts of the permanent magnets abutting on these portions of the cavities.

In a mobile working machine according to an embodiment of the invention, also the generator 463 is a permanent magnet electrical machine of the kind described above. It is also possible that only the generator 463 is a permanent magnet electrical machine of the kind described above, and the electrical motors 464, 465 are electrical machines of some other kind.

A mobile working machine according to an embodiment of the invention comprises a liquid cooling system 466 arranged to cool the electromechanical power transmission chain 462.

A mobile working machine according to an embodiment of the invention comprises a liquid cooling system arranged to cool both a hydraulic system 467 of the mobile working machine and the electromechanical power transmission chain 462.

A mobile working machine according to an embodiment of the invention comprises a liquid cooling system arranged to cool both the electromechanical power transmission chain 462 and the combustion engine 461.

In a mobile working machine according to an embodiment of the invention, the electromechanical power transmission chain comprises a battery 468 and/or an electric double-layer capacitor arranged to respond to peak power needs exceeding the maximum power of the combustion engine 461. The battery and/or the electric double-layer capacitor can be connected, for example, to a direct voltage intermediate circuit of the frequency converter 469. An electric double-layer capacitor is often called a "super capacitor".

The specific examples provided in the description given above should not be construed as limiting. Therefore, the invention is not limited merely to the exemplifying embodiments described above.

What is claimed is:

1. A rotor for a permanent magnet electrical machine, the rotor comprising:

a ferromagnetic core structure comprising cavities dividing the ferromagnetic core structure into pole regions, a yoke region, and bridges between the pole regions and the yoke region, and permanent magnets located in the cavities and arranged to produce magnetic fluxes penetrating the pole regions in radial directions so as to form magnetic poles of the rotor, the direction of the magnetic flux penetrating each pole region defining a direct-axis of the corresponding magnetic pole and a symmetry line between direct-axes of two adjacent magnetic poles defining a quadrature-axis between these two adjacent magnetic poles, wherein the cavities have portions which extend towards the quadrature-axis and are free from the permanent magnets so as to form non-ferromagnetic regions for reducing leakage fluxes of the permanent magnets, and the portions of the cavities have a shape curving towards a geometrical rotation axis of the rotor and radial height of the portions of the cavities is greater than radial thickness of parts of the permanent magnets abutting on the portions of the cavities, and wherein the ferromagnetic core structure defining the portions of the cavities and facing towards the non-ferromagnetic regions have profiles in a plane perpendicular to the geometrical rotation axis of the rotor so that:
   a) each of the profiles is curvilinear on a portion of the profile from a first point of the profile farthest from the geometrical rotation axis of the rotor to a second point of the profile nearest to the geometrical rotation axis of the rotor,
   b) the radius of curvature of each of the profiles depends on distance to the geometrical rotation axis of the rotor so that the radius of curvature is an ascending function of the distance on the portion of the profile from the first point of the profile to the second point of the profile, and
   c) each of the profiles is substantially tangentially directed and meets the relevant permanent magnet at the first point of the profile.

2. A rotor according to claim 1, wherein the permanent magnets are rectangular prisms, a direction of magnetization of each permanent magnet is substantially perpendicular to two mutually opposite facets of that permanent magnet, and a spatial line via a center of mass of that permanent magnet and perpendicular to the two mutually opposite facets of that permanent magnet is substantially radially directed.

3. A rotor according to claim 2, wherein the number of the permanent magnets per the number of the magnetic poles of the rotor is two.

4. A rotor according to claim 1, wherein the ferromagnetic core structure comprises grooves on its outer surface between adjacent magnetic poles of the rotor for narrowing the bridges which are tangentially as outmost in each magnetic pole of the rotor so as to reduce the leakage fluxes of the permanent magnets.

5. A rotor according to claim 4, wherein there are two grooves between adjacent magnetic poles of the rotor so that there is a ridge between these two grooves so as to increase a quadrature-axis inductance.

6. A rotor according to claim 1, wherein the number of the magnetic poles of the rotor is at least ten.

7. A rotor according to claim 1, wherein the ferromagnetic core structure comprises ferromagnetic steel sheets stacked in the direction of the geometrical rotation axis of the rotor.

8. A rotor according to claim 1, wherein the ferromagnetic core structure is made of solid steel.

9. A rotor according to claim 1, wherein the radial height of the portions of the cavities is at least 10% greater than the radial thickness of the parts of the permanent magnets abutting on the portions of the cavities.

10. A rotor according to claim 2, wherein corners of the bridges between adjacent permanent magnets of each magnetic pole of the rotor comprise roundings that extend away from the respective corners of the permanent magnets so as to form non-ferromagnetic regions for reducing leakage fluxes of the permanent magnets.

11. A rotor according to claim 2, wherein the ferromagnetic core structure comprises grooves on its outer surface between adjacent magnetic poles of the rotor for narrowing the bridges which are tangentially as outmost in each magnetic pole of the rotor so as to reduce the leakage fluxes of the permanent magnets.

12. A rotor according to claim 3, wherein the ferromagnetic core structure comprises grooves on its outer surface between adjacent magnetic poles of the rotor for narrowing the bridges which are tangentially as outmost in each magnetic pole of the rotor so as to reduce the leakage fluxes of the permanent magnets.

13. A mobile working machine comprising:
   a combustion engine, and
   an electromechanical power transmission chain between the combustion engine and one or more wheels of the mobile working machine,
wherein the electromechanical transmission chain comprises at least one permanent magnet electrical machine comprising a rotor and a stator, the rotor comprising:
   a ferromagnetic core structure comprising cavities dividing the ferromagnetic core structure into pole regions, a yoke region, and bridges between the pole regions and the yoke region, and
   permanent magnets located in the cavities and arranged to produce magnetic fluxes penetrating the pole regions in radial directions so as to form magnetic poles of the rotor, the direction of the magnetic flux penetrating each pole region defining a direct-axis of the corresponding magnetic pole and a symmetry line between direct-axes of two adjacent magnetic poles defining a quadrature-axis between these two adjacent magnetic poles,
wherein the cavities have portions which extend towards the quadrature-axis and are free from the permanent magnets so as to form non-ferromagnetic regions for reducing leakage fluxes of the permanent magnets, and the portions of the cavities have a shape curving towards a geometrical rotation axis of the rotor and radial height of the portions of the cavities is greater than radial thickness of parts of the permanent magnets abutting on the portions of the cavities, and wherein the ferromagnetic core structure defining the portions of the cavities and facing towards the non-ferromagnetic regions have profiles in a plane perpendicular to the geometrical rotation axis of the rotor so that:
   a) each of the profiles is curvilinear on a portion of the profile from a first point of the profile farthest from the geometrical rotation axis of the rotor to a second point of the profile nearest to the geometrical rotation axis of the rotor,
   b) the radius of curvature of each of the profiles depends on distance to the geometrical rotation axis of the rotor so that the radius of curvature is an ascending function of the distance on the portion of the profile from the first point of the profile to the second point of the profile, and
   c) each of the profiles is substantially tangentially directed and meets the relevant permanent magnet at the first point of the profile.

14. A mobile working machine according to claim 13, wherein the mobile working machine comprises a liquid cooling system arranged to cool the electromechanical power transmission chain.

15. A mobile working machine according to claim 14, wherein the liquid cooling system is arranged to cool both the electromechanical power transmission chain and a hydraulic system of the mobile working machine.

16. A mobile working machine according to claim 14, wherein the liquid cooling system is arranged to cool both the electromechanical power transmission chain and the combustion engine.

17. A mobile working machine according to claim 13, wherein the electromechanical power transmission chain comprises at least one of the following for responding to peak power needs exceeding the maximum power of the combustion engine: a battery, an electric double-layer capacitor.

18. A mobile working machine according to claim 14, wherein the electromechanical power transmission chain comprises at least one of the following for responding to peak power needs exceeding the maximum power of the combustion engine: a battery, an electric double-layer capacitor.

19. A mobile working machine according to claim 15, wherein the electromechanical power transmission chain comprises at least one of the following for responding to peak power needs exceeding the maximum power of the combustion engine: a battery, an electric double-layer capacitor.

20. A mobile working machine according to claim 16, wherein the electromechanical power transmission chain comprises at least one of the following for responding to peak power needs exceeding the maximum power of the combustion engine: a battery, an electric double-layer capacitor.

* * * * *